United States Patent
Mano

(10) Patent No.: US 10,535,353 B2
(45) Date of Patent: Jan. 14, 2020

(54) INFORMATION PROCESSING SYSTEM AND INFORMATION PROCESSING APPARATUS

(71) Applicant: Takuro Mano, Kanagawa (JP)

(72) Inventor: Takuro Mano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/918,223

(22) Filed: Mar. 12, 2018

(65) Prior Publication Data

US 2018/0268822 A1 Sep. 20, 2018

(30) Foreign Application Priority Data

Mar. 17, 2017 (JP) .................... 2017-053016

(51) Int. Cl.

| G10L 15/30 | (2013.01) |
| H04L 29/06 | (2006.01) |
| G10L 15/22 | (2006.01) |
| G10L 25/27 | (2013.01) |
| G10L 15/08 | (2006.01) |

(52) U.S. Cl.
CPC .............. *G10L 15/30* (2013.01); *G10L 15/08* (2013.01); *G10L 15/22* (2013.01); *G10L 25/27* (2013.01); *H04L 65/601* (2013.01); *H04L 65/607* (2013.01); *H04L 65/80* (2013.01); *G10L 2015/088* (2013.01); *G10L 2015/223* (2013.01)

(58) Field of Classification Search
CPC ......... G10L 15/30; G10L 15/22; G10L 25/27; G10L 15/08; G10L 2015/223; G10L 2015/088; H04L 65/602; H04L 65/80; H04L 65/607; H04L 65/601

USPC ........................................................... 704/211
See application file for complete search history.

(56) References Cited

U.S. PATENT DOCUMENTS

| 2002/0089928 A1* | 7/2002 | Morikawa ............... H04L 43/16 370/229 |
| 2007/0286279 A1* | 12/2007 | Hamanaka ........ H04L 29/06027 375/240.12 |
| 2013/0047190 A1 | 2/2013 | Suzuki et al. |
| 2013/0162663 A1 | 6/2013 | Mano et al. |
| 2013/0314427 A1 | 11/2013 | Suzuki et al. |
| 2015/0040012 A1* | 2/2015 | Faaborg .................. G06F 3/167 715/728 |
| 2015/0382059 A1 | 12/2015 | Mano |
| 2016/0277462 A1 | 9/2016 | Morita et al. |
| 2017/0178290 A1 | 6/2017 | Sugiura et al. |
| 2017/0186407 A1 | 6/2017 | Mano et al. |

FOREIGN PATENT DOCUMENTS

| JP | 2014-029922 | 2/2014 |
| JP | 2016-174342 | 9/2016 |

* cited by examiner

*Primary Examiner* — Bharatkumar S Shah
(74) *Attorney, Agent, or Firm* — Harness, Dickey and Pierce, P.L.C.

(57) ABSTRACT

An information processing system includes circuitry to determine whether to change a data amount of contents data including audio data, to be transmitted among a plurality of devices disposed in the information processing system, based on a communication delay time required for communication among the plurality of devices, and adjust a data amount of data other than the audio data among the contents data based on the communication delay time.

13 Claims, 12 Drawing Sheets

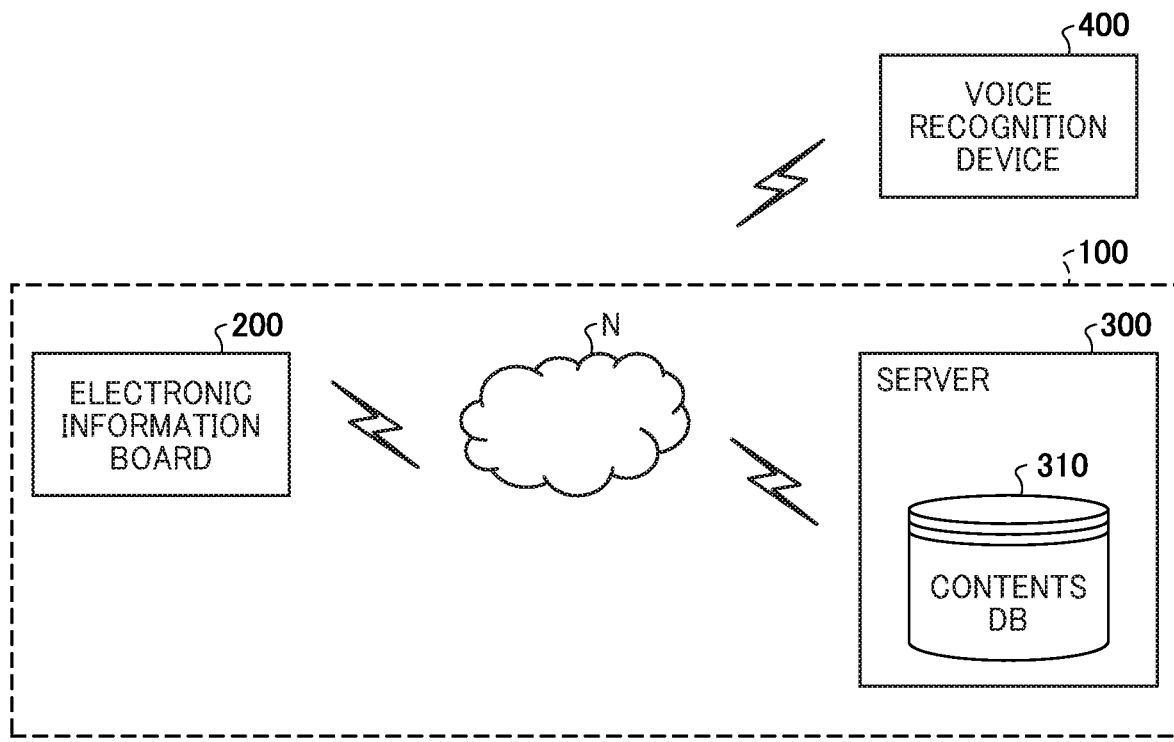
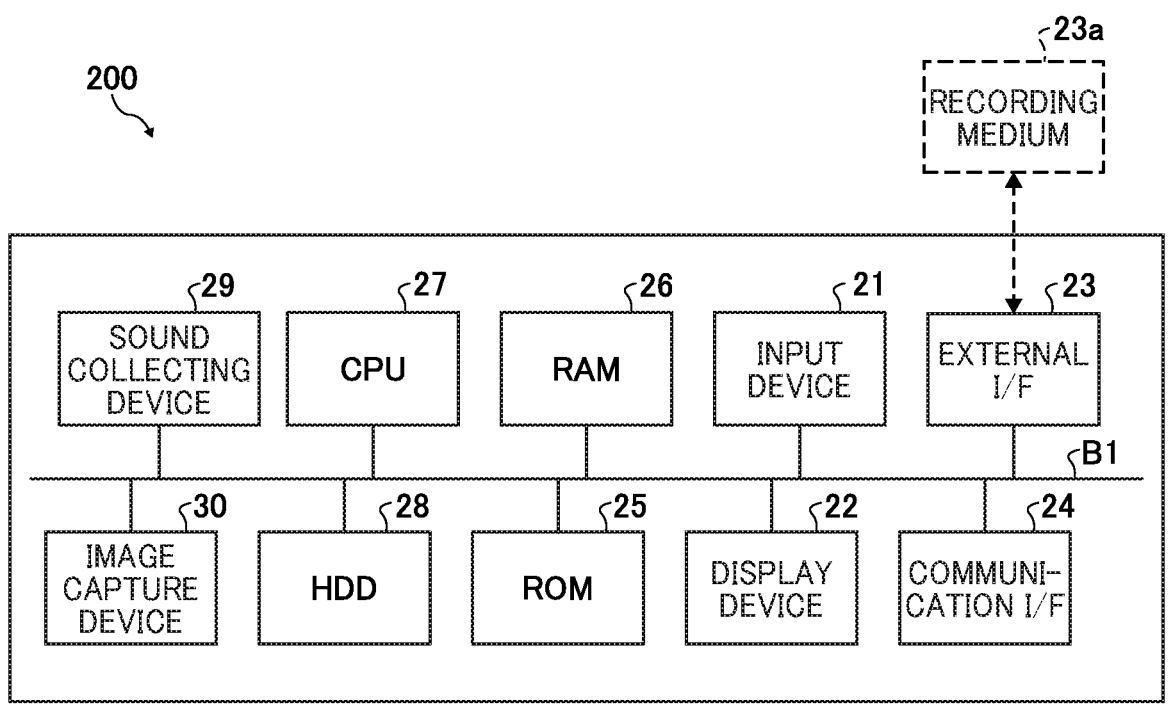

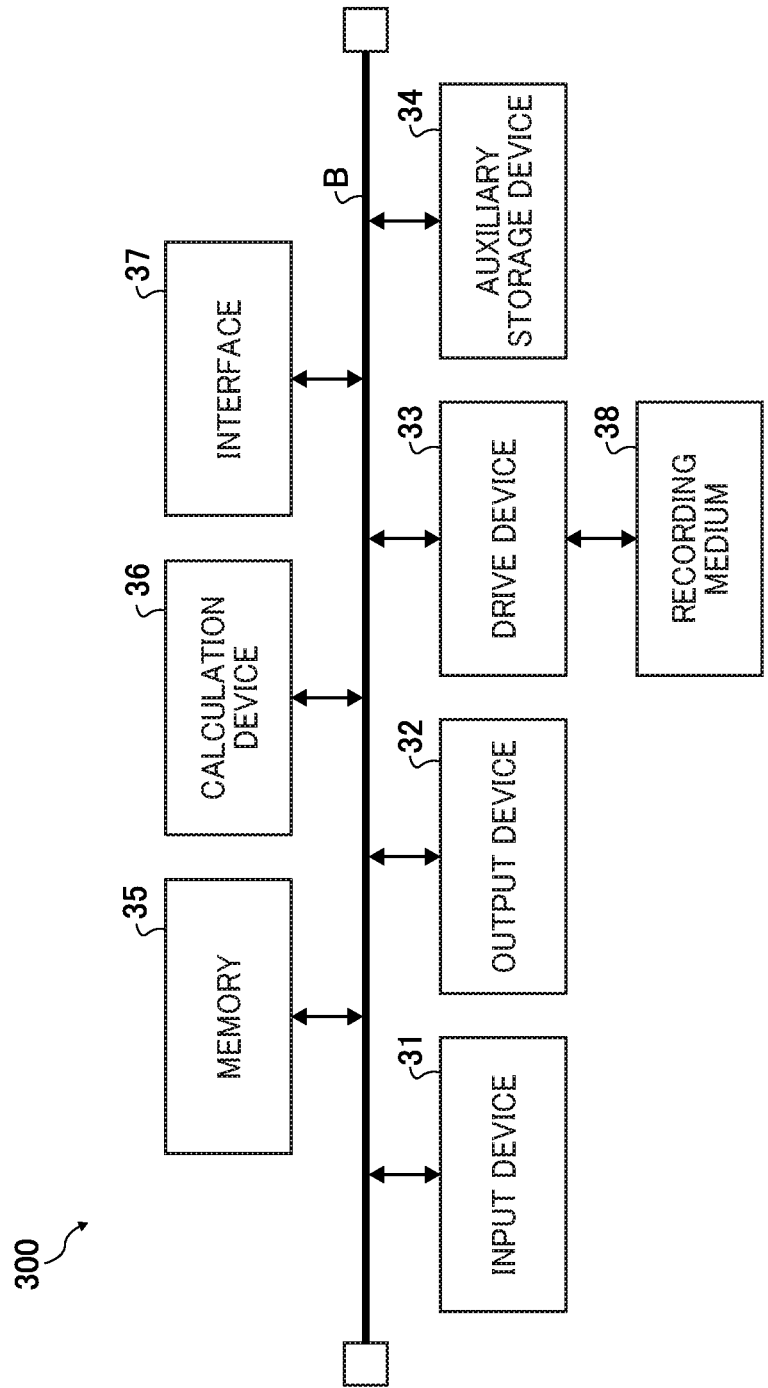

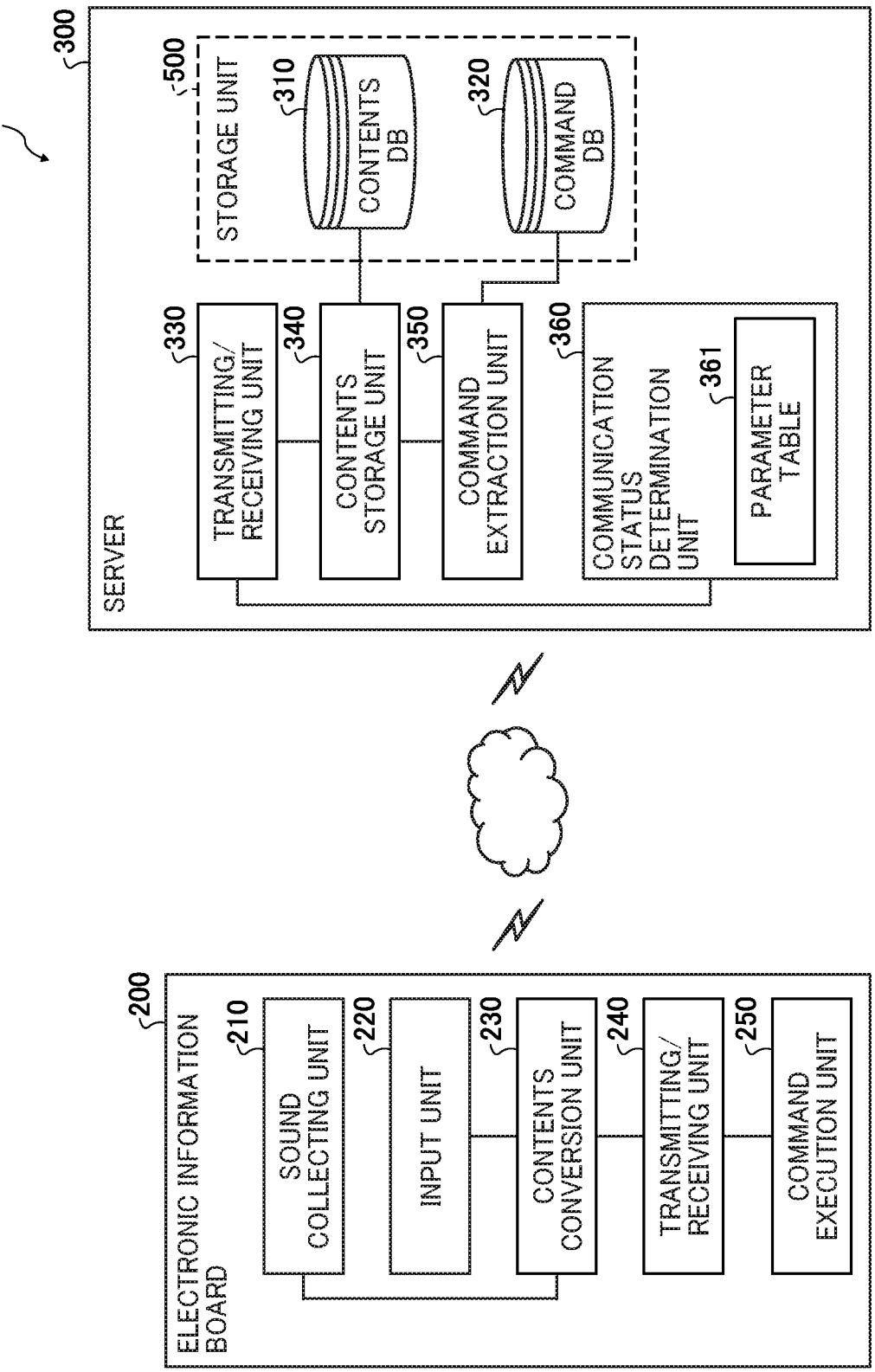

| COMMUNICATION DELAY TIME | PARAMETER (FRAME RATE) |
|---|---|
| EXCEED 1 SECOND | SET 5 fps |
| EXCEED 1 SECOND FOR 10 SECONDS | SET 3 fps |
| EXCEED 5 SECONDS | SET 1 fps |
| 1 SECOND OR LESS FOR 10 SECONDS | SET DEFAULT OF 20 fps |

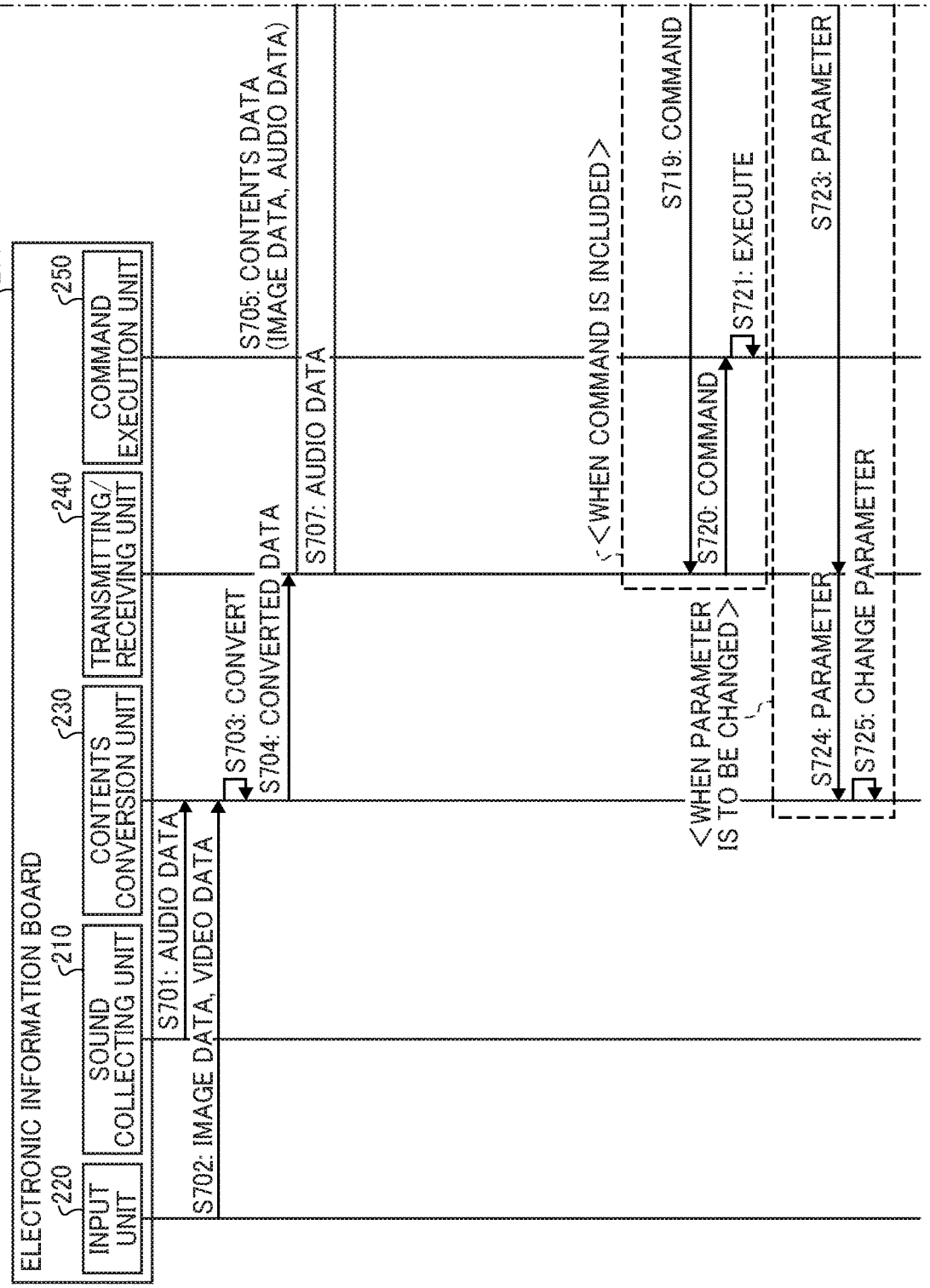

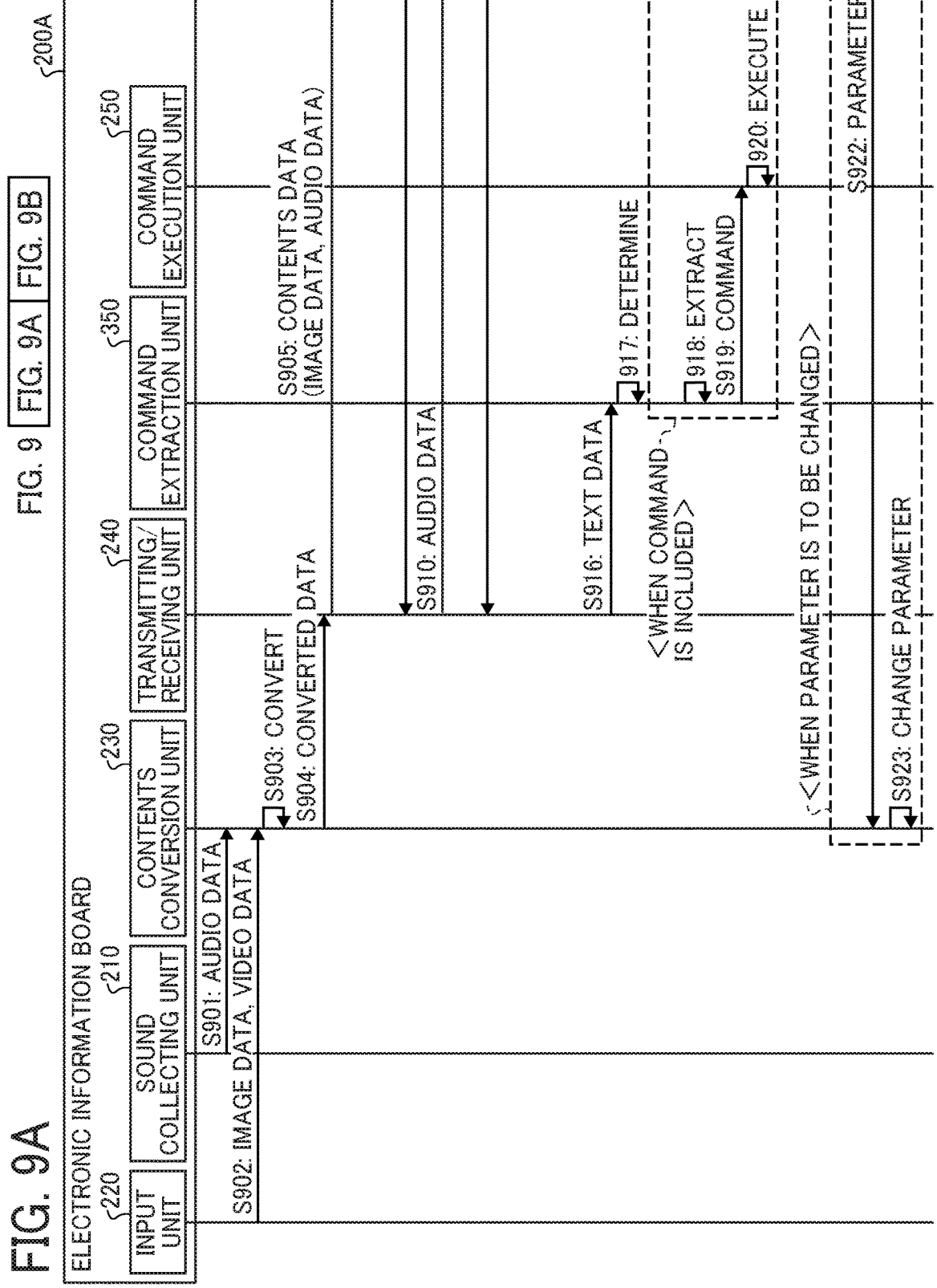

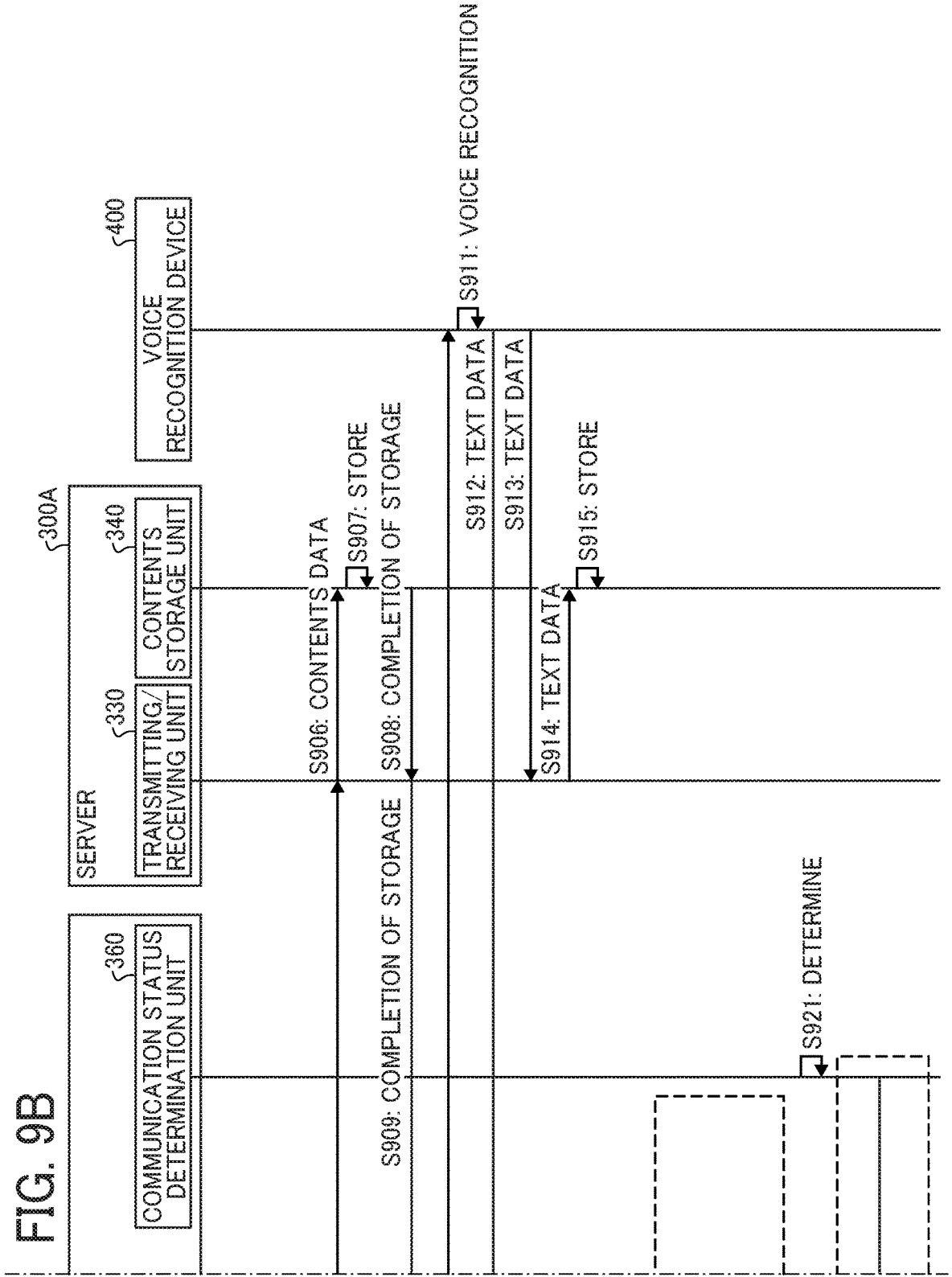

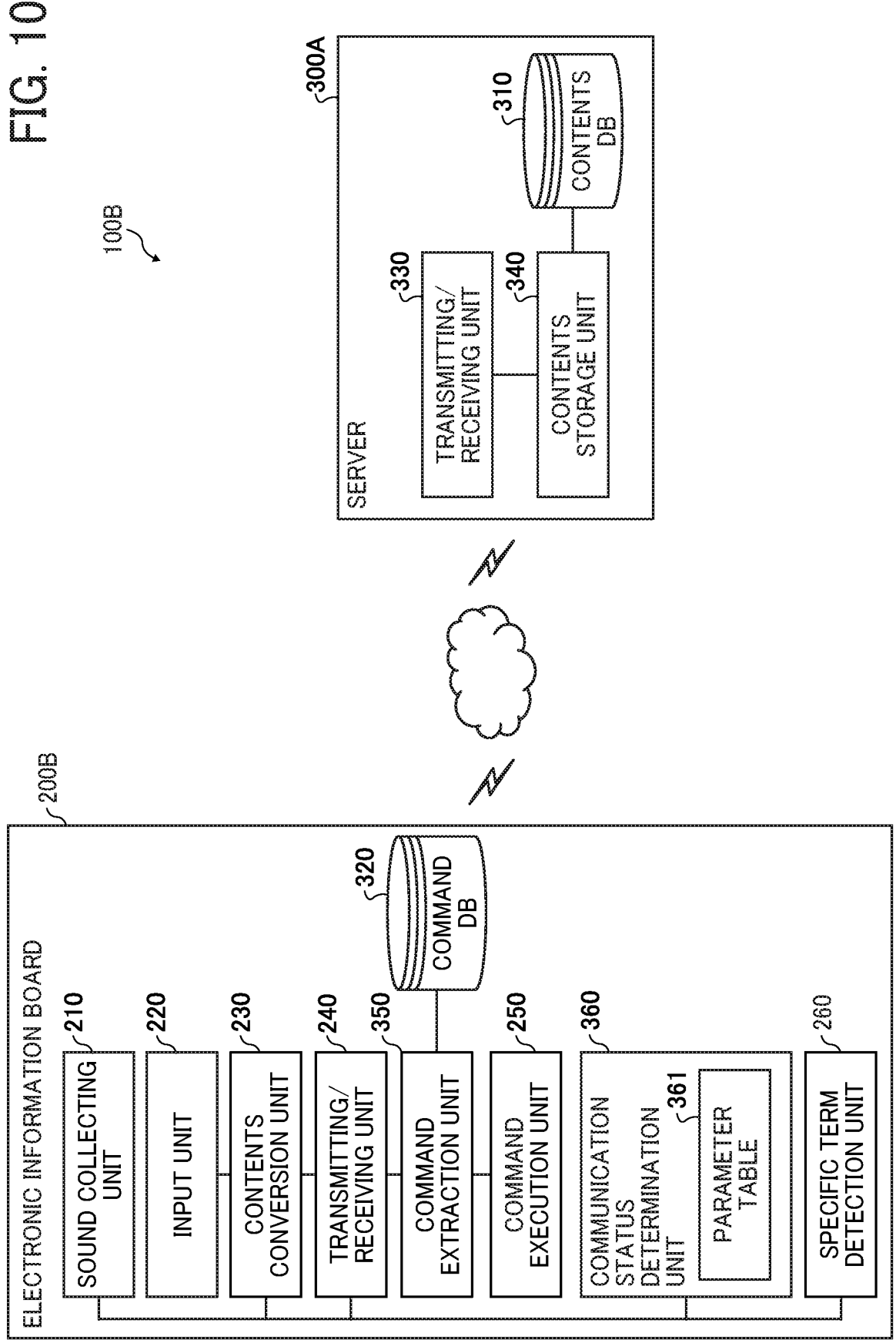

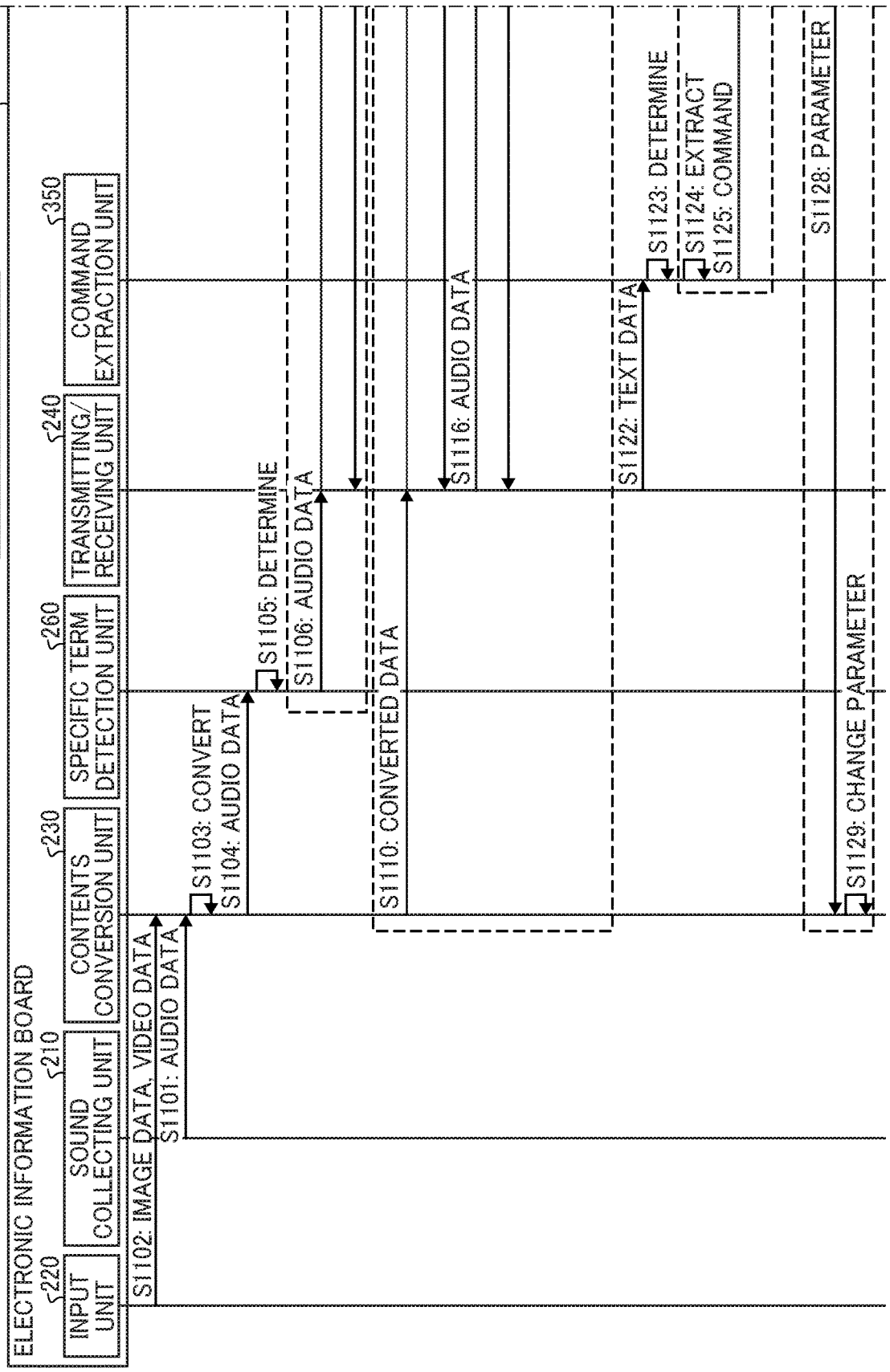

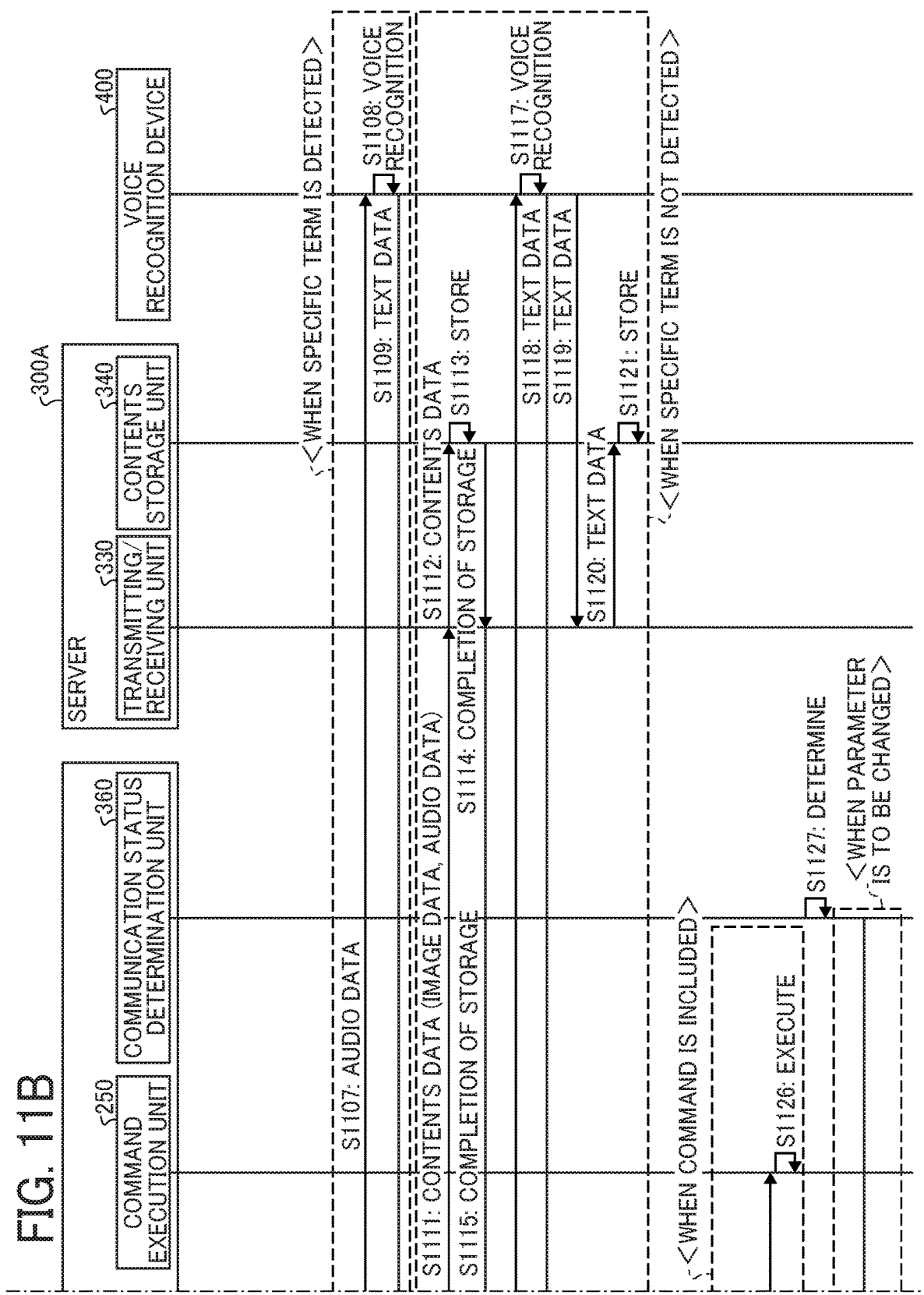

INFORMATION PROCESSING SYSTEM AND INFORMATION PROCESSING APPARATUS

CROSS-REFERENCE TO RELATED APPLICATION

This application claims priority pursuant to 35 U.S.C. § 119(a) to Japanese Patent Application No. 2017-053016, filed on Mar. 17, 2017 in the Japan Patent Office, the disclosure of which is incorporated by reference herein in its entirety.

BACKGROUND

Technical Field

This disclosure relates to an information processing system, and an information processing apparatus.

Background Art

More and more apparatuses can be operated by using voice with the advancement of technology in recognition of natural languages and the improvement of a service known as artificial intelligence (AI). The voice operation can be performed in two ways. 1) Voice recognition is performed on a device to be operated, and then a command is executed, or 2) voice data is transmitted to a cloud service such as a server from a device to be operated, and the device executes a command which is a result of the voice recognition performed by the cloud service.

In this cloud service environment, voice data collected by the device is transferred to the server via the Internet, and a command recognized by the voice recognition processing is returned to the device from the server. Therefore, a time period between the acquisition of voice data and the execution of the command at the device is affected depending on a network bandwidth.

In such a communication system, ingenuity such as changing the data transfer amount per unit time depending on the network communication situation is performed. Typically, the data transmitted and received through the network includes not only voice data but also other contents data such as image data, audio data, video data, and document data. Therefore, when the voice is used to operate the device in conventional communication systems, the network bandwidth may be used for transmitting and receiving the contents data other than the voice data, in which responsiveness of voice-activated operation at the device may become slower.

SUMMARY

As one aspect of the present invention, an information processing system is devised. The information processing system includes circuitry to determine whether to change a data amount of contents data including audio data, to be transmitted among a plurality of devices disposed in the information processing system, based on a communication delay time required for communication among the plurality of devices; and adjust a data amount of data other than the audio data among the contents data based on the communication delay time.

As another aspect of the present invention, an information processing apparatus is devised. The information processing apparatus includes circuitry to determine whether to change a data amount of contents data including audio data to be transmitted between the information processing apparatus and an external device based on a communication delay time required for communication between the information processing apparatus and the external device, the external device including a sound collecting apparatus used for collecting the audio data, and transmit an instruction to the external device including the sound collecting apparatus to instruct the external device to adjust a data amount of data other than the audio data among the contents data based on the communication delay time.

As still another aspect of the present invention, an information processing apparatus is devised. The information processing apparatus includes a sound collecting device to collect audio data, and circuitry to transmit and receive contents data including the audio data collected by the sound collecting device with an external device, determine whether to change a data amount of the contents data to be transmitted between the information processing apparatus and the external device based on a communication delay time required for communication between the information processing apparatus and the external device, and adjust a data amount of data other than the audio data among the contents data based on the communication delay time.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 1 illustrates an example of a system configuration of an information processing system of a first embodiment;

FIG. 2 illustrates an example of a hardware block diagram of an electronic information board used in the information processing system of FIG. 1;

FIG. 3 illustrates an example of a hardware block diagram of a server used in the information processing system of FIG. 1;

FIG. 4 illustrates an example of functional block diagrams of the electronic information board and the server used in the information processing system of FIG. 1;

FIGS. 7A and 7B are a sequence diagram illustrating an operation of the information processing system of FIG. 1.

FIGS. 9A and 9B are a sequence diagram illustrating an operation of the information processing system of FIG. 8;

FIG. 10 illustrates an example of functional block diagrams of an electronic information board and a server used in an information processing system of a third embodiment; and FIGS. 11A and 11B are a sequence diagram illustrating an operation of the information processing system of FIG. 10.

Figures 5, 6:
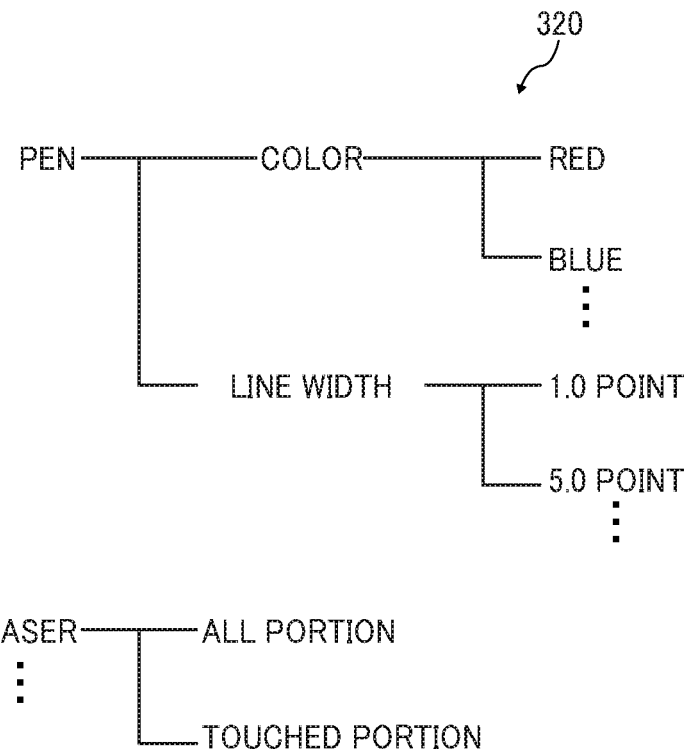
FIG. 5 illustrates an example of a command database (DB) of the first embodiment.
FIG. 6 is an example of a parameter table of the first embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

First Embodiment

Hereinafter, a description is given of a first embodiment with reference to the drawings. FIG. 1 illustrates an example of a system configuration of an information processing system 100 of the first embodiment.

As illustrated in FIG. 1, the information processing system 100 includes, for example, an electronic information board 200, and a server 300. The electronic information board 200 and the server 300 are example of information processing apparatuses. In the information processing system 100, the electronic information board 200 and the server 300 are connected, for example, via a network N. Further, the information processing system 100 is connected to a voice recognition device 400 through the network N. The voice recognition device 400 is used to convert audio data into text data.

In the information processing system 100, the electronic information board 200 transmits various information such as stroke information indicating characters and images written on a display of the electronic information board 200, and image data generated by capturing a screen of the electronic information board 200. The electronic information board 200 also includes, for example, a sound collecting device such as a microphone. The electronic information board 200 is configured to transmit audio data collected by the sound collecting device to the server 300 and the voice recognition device 400.

The voice recognition device 400 can be provided as a service provided, for example, by using artificial intelligence (AI). The voice recognition device 400 converts the received audio data into text data by using the voice recognition function, and transmits the text data to the server 300.

In this disclosure, the audio data means data of various types of sound collected by the sound collecting device such as human voice voiced near the electronic information board 200, or various sounds other than the human voice. Therefore, in this disclosure, voice data indicating voice of person voiced near or around the electronic information board 200 is a part of the audio data.

Further, the electronic information board 200 can receive an operation instruction or command corresponding to the voice data by using the voice recognition function of the voice recognition device 400. That is, the electronic information board 200 can be operated by using the voice, which means the voice-activated operation can be performed on the electronic information board 200.

The server 300 stores various data such as received stroke information, image data, audio data, or the like. The server 300 further stores text data transmitted from the voice recognition device 400 in association with the audio data.

In an example case that the electronic information board 200 is used at a meeting, the server 300 may store a conference name, scroll information, image data, and audio data acquired during the meeting by associating these data with each other. In other words, the server 300 can be configured to store various information of each meeting acquired from the electronic information board 200.

Further, the server 300 determines a congestion level of the network. When the network is congested, the audio data transmission from the electronic information board 200 to the voice recognition device 400 is prioritized over the transmission of other contents data.

In the embodiments described in this disclosure, when the network is congested, the audio data collected at the electronic information board 200 is preferentially transmitted to the voice recognition device 400 to improve the responsiveness of the electronic information board 200 to the operation instruction by voice.

In FIG. 1, the device or apparatus, which is the subject of the voice operation, is the electronic information board 200, but not limited thereto. In the information processing system 100, a target device or apparatus operable by the voice operation includes a sound collecting device, and is configured to communicate with the voice recognition device 400. More specifically, the target device or apparatus operable by the voice operation is, for example, a general computer, a tablet terminal, a smartphone, or the like. Further, the embodiment described in this disclosure can be applied to various electronic apparatuses.

In this description, various data transmitted from the electronic information board 200 to the server 300 are referred to as contents data. Accordingly, the contents data includes, for example, audio data, image data, video data, stroke information, or the like.

Hereinafter, a description is given of apparatuses used in the information processing system 100 with reference to FIG. 2. FIG. 2 illustrates an example of a hardware block diagram of the electronic information board 200 of the first embodiment.

As illustrated in FIG. 2, the electronic information board 200 includes, for example, an input device 21, a display device 22, an external interface (I/F) 23, a communication interface (I/F) 24, and a read only memory (ROM) 25. The electronic information board 200 further includes, for example, a random access memory (RAM) 26, a central processing unit (CPU) 27, a hard disk drive (HDD) 28, a sound collecting device 29, and an image capture device 30. These hardware resources are connected with each other by a bus B1.

The input device 21 is, for example, a touch panel, which is used by a user for inputting various operations (e.g., selection operation of voice-to-text conversion in Japanese and voice-to-text conversion in English). The display device 22 is, for example, a display that displays various information (e.g., text indicating a conversion result by voice-to-text conversion in Japanese). In the embodiment, the touch panel may serve as both the input device 21 and the display device 22.

The external I/F 23 is an interface to be connected with an external device. The external device includes, for example, a recording medium 23a. With this configuration, the electronic information board 200 can read data from the recording medium 23a and write data to the recording medium 23a via the external I/F 23. The recording medium 23a includes, for example, a universal serial bus (USB) memory, a compact disk (CD), a digital versatile disc (DVD), a secure digital (SD) memory card, or the like.

The communication I/F 24 is an interface used for connecting the electronic information board 200 with the network N or the like. With this configuration, the electronic information board 200 can communicate with other devices or apparatuses via the communication I/F 24.

The HDD 28 is a non-volatile storage device that stores programs and data. The programs and data stored in the HDD 28 include, for example, operating system (OS), which is a basic software for controlling the electronic information board 200 entirely, and application programs used for providing various functions on the OS.

The HDD 28 further manages the stored programs and data by using a given file system and/or database (DB). The electronic information board 200 may have a drive device such as a solid state drive (SSD) that uses a flash memory as a recording medium instead of the HDD 28.

The ROM 25 is a non-volatile semiconductor memory that can store programs and data even when the power is turned off. The ROM 25 stores programs such as basic input/output system (BIOS), OS settings, and network settings to be executed when to activate the electronic information board 200. The RAM 26 is a volatile semiconductor memory that temporarily stores programs and data.

The CPU 27 is a computing device for controlling the electronic information board 200 and function of the electronic information board 200 by reading out the programs and data from a storage device such as the ROM 25 and the HDD 28 on the RAM 26, and executing the programs. The CPU 27 can be implemented, for example, as circuitry or one or more processors.

The sound collecting device 29 is, for example, a microphone that collects sound around the electronic information board 200.

The image capture device 30 is, for example, a camera that captures image of scenes near the electronic information board 200. Specifically, for example, the image capture device 30 captures a scene of meeting using the electronic information board 200.

The electronic information board 200 has the hardware block diagram illustrated in FIG. 2 to implement various processes to be described later.

Hereinafter, a description is given of a hardware block diagram of the server 300 with reference to FIG. 3. FIG. 3 illustrates an example of the hardware block diagram of the server 300 of the first embodiment.

The server 300 is a general information processing apparatus, and includes, for example, an input device 31, an output device 32, a drive device 33, an auxiliary storage device 34, a memory 35, an calculation device 36, and an interface 37, in which each of these are connected to each other by bus B.

The input device 31 is, for example, a mouse and a keyboard used for inputting various kinds of information. The output device 32 is, for example, a display that displays or outputs various signals. The interface 37 includes, for example, a modem, a local area network (LAN) card, or the like that is used to connect with the network.

Information processing program is at least part of the various programs used for controlling the server 300. The information processing program is provided, for example, by distribution of a recording medium 38, and downloading from the network. The recording medium 38, which records the information processing program, can use various types of recording media such as recording media that optically, electrically, or magnetically records information such as a compact disc read only memory (CD-ROM), a flexible disk, magneto-optical disk, and a semiconductor memory that electrically records the information such as a ROM, a flash memory, or the like.

When the recording medium 38 recorded with the information processing program is set in the drive device 33, the information processing program is installed from the recording medium 38 to the auxiliary storage device 34 via the drive device 33. Further, a communication program downloaded from the network can be installed in the auxiliary storage device 34 via the interface 37.

The auxiliary storage device 34 stores the installed information processing program, and necessary files and data. The memory 35 reads the information processing program from the auxiliary storage device 34 when the computer is activated, and stores the information processing program in the memory 35. The calculation device 36 implements various processes to be described later in accordance with the programs stored in the memory 35.

Hereinafter, a description is given of functions of each device or apparatus used in the information processing system 100 with reference to FIG. 4. FIG. 4 illustrates a functional block diagram of each of the devices or apparatuses used in the information processing system 100 of the first embodiment.

First, a description is given of a functional block diagram of the electronic information board 200. As illustrated in FIG. 4, the electronic information board 200 includes, for example, a sound collecting unit 210, an input unit 220, a contents conversion unit 230, a transmitting/receiving unit 240, and a command execution unit 250.

The sound collecting unit 210 acquires audio input to the sound collecting device 29 as audio data.

The input unit 220 acquires, for example, stroke information indicating characters and images written on the touch panel (e.g., input device 21, display device 22) of the electronic information board 200 by hand, and image data of images displayed on the touch panel. The stroke information is a collection of coordinate information of points indicating the locus of each stroke when a user performs handwriting on the touch panel as an input of information. Further, the input unit 220 acquires video data captured by the image capture device 30.

The contents conversion unit 230 converts a format of audio data, image data, and video data into a format that can be stored and processed in the server 300. Specifically, the contents conversion unit 230 uses, for example, an advanced audio coding (AAC) format for audio data, and joint photographic experts group (JPEG) format for image data and video data. In the embodiment, the contents conversion unit 230 compresses various kinds of data by using the above mentioned formats so that the data can be transmitted and received via the network easily and the memory capacity of the server 300 is not used too much. In the embodiment, the video data is one example of the image data.

The contents conversion unit 230 changes the compression rate and resolution of the image data, and the frame rate of the video data based on a notification from the server 300 to be described later. More specifically, the contents conversion unit 230 changes at least one of the compression rate and resolution of the image data, and the frame rate of the video data to adjust a data amount of the contents data other than the audio data, which is to be transmitted to the server 300. In other words, when the contents conversion unit 230 receives the notification from the server 300, the contents conversion unit 230 adjusts the processing load on the network N by increasing or decreasing the data amount of the contents data other than the audio data.

In the following description, the compression rate, resolution of the image data and the frame rate of the video data are referred to as parameters. The parameter is a value that is referred to when the format of the contents inputted by the input unit 220 is converted into a format compatible with the server 300. In the embodiment, the data amount of the contents data other than the audio data, to be transmitted to the server 300, is adjusted by changing the value of the parameters. The details of the processing by the contents conversion unit 230 is to be described later.

The transmitting/receiving unit 240 transmits the audio data acquired by the sound collecting unit 210 to the server 300 and the voice recognition device 400. Further, the transmitting/receiving unit 240 transmits the image data and video data acquired by the input unit 220 to the server 300. Further, the transmitting/receiving unit 240 receives a command indicating operation contents on the electronic information board 200 from the server 300, and a notification related to the data conversion at the contents conversion unit 230 from the server 300.

After the transmitting/receiving unit 240 receives the command instructing a specific operation from the server 300, the command execution unit 250 executes the specific operation based on the command received from the server 300

Hereinafter, a description is given of a functional block diagram of the server 300. As illustrated in FIG. 4, the server 300 includes, for example, a transmitting/receiving unit 330, a contents storage unit 340, a command extraction unit 350, and a communication status determination unit 360. These units can be implemented when the calculation device 36 reads the information processing program from the memory 35, and executes the information processing program.

The server 300 further includes, for example, a storage unit 500. The storage unit 500 stores, for example, a contents database (DB) 310 and a command database (DB) 320. The storage unit 500 can be provided in, for example, the auxiliary storage device 34 of the server 300.

Further, the storage unit 500 indicates a memory area in the memory, and the storage unit 500 may be implemented by a plurality of memories.

The contents DB 310 stores various kinds of data such as contents data received from the electronic information board 200. The contents data includes, for example, audio data, image data, video data, and stroke information.

The command DB 320 is stored in the storage unit 500 by associating the recognition result of the audio data and the operation contents of the electronic information board 200. The details of the command DB 320 is to be described later.

The transmitting/receiving unit 330 receives information from the electronic information board 200, and transmits information to the electronic information board 200, and further, the transmitting/receiving unit 330 receives information from the voice recognition device 400.

The contents storage unit 340 stores the contents data received from the electronic information board 200 in the contents DB 310.

The command extraction unit 350 extracts text data received from the voice recognition device 400, and one or more commands used for the electronic information board 200 included in the command DB 320, wherein the commands may be included in the audio data such as voice data.

The communication status determination unit 360 determines a congestion level of the network N based on the timing of transmitting and receiving information by the transmitting/receiving unit 330. The communication status determination unit 360 includes, for example, a parameter table 361. When the network N is congested, the communication status determination unit 360 refers to the parameter table 361 to notify to the contents conversion unit 230 of the electronic information board 200 to reduce the data amount other than audio data. The details of the parameter table 361 is to be described later.

Hereinafter, a description is given of the command DB 320 with reference to FIG. 5. FIG. 5 illustrates an example of the command DB 320 of the first embodiment.

The command DB 320 employs, for example, a tree structure to correlate a plurality of terms such as words, in which one word indicating one operation contents is associated with a plurality of words.

In an example of FIG. 5, for example, a word of "pen" is associated with two words of "color" and "line width," and the word of "color" is associated with two words of "red" and "blue" indicating the line color. Further, the word of "line width" is associated with two words of "1.0 point" and "5.0 point" indicating the line width.

Hereinafter, a description is given of the parameter table 361 with reference to FIG. 6. FIG. 6 is an example of the parameter table 361 of the first embodiment.

In an example of FIG. 6, the parameter table 361 employs, for example, the frame rate of the video data as the parameter to implement a method of reducing the data amount of contents data other than the audio data by changing the frame rate of the video data.

In the parameter table 361 illustrated in FIG. 6, the parameter table 361 stores the communication delay time and the frame rate as information items associated with each other.

A value of the "communication delay time" indicates, for example, a time difference between a time point when the server 300 receives the audio data included in the contents data from the electronic information board 200 and a time point when the server 300 receives the text data from the voice recognition device 400. The value of the "communication delay time" may be any value if the value indicates the time period required for communication between the server 300 and the electronic information board 200, and/or between the server 300 and the voice recognition device 400.

A value of the "frame rate" indicates the value of the frame rate used for transmitting the video data to the server 300 from the electronic information board 200.

As indicated in an example of FIG. 6, when the communication delay time exceeds 1 second, the frame rate of 5 fps (frame per second) is set, and if the communication delay time exceeds 1 seconds for 10-seconds period or more, the frame rate of 3 fps is set. Further, in an example of FIG. 6, when the communication delay time exceeds 5 seconds, the frame rate of 1 fps is set, and when the communication delay time becomes 1 second or less for 10-seconds period, the frame rate of 20 fps, which is the default value of the frame rate, is set.

Therefore, FIG. 6 indicates that the longer the communication delay time, the lower the frame rate.

In the parameter table 361 of FIG. 6, the communication delay time and the frame rate are associated with each other, but not limited thereto. In the parameter table 361, the communication delay time be associated with the compression ratio and the resolution of the image data and the video data. In the embodiment, for example, the longer the communication delay time, the greater the compression ratio to reduce the data amount. Further, in the embodiment, for example, the longer the communication delay time, the lower the resolution to reduce the data amount.

In the parameter table 361, the communication delay time is associated with any parameter to implement any method of adjusting (e.g., increasing, decreasing) the parameter to adjust the data amount depending on the communication delay time.

Further, the settings of the communication delay time illustrated in FIG. 6 is an example, but not limited thereto. For example, in the parameter table 361, the frame rate can be set with 1 fps when the communication delay time exceeds 2 seconds. The relationship between the communication delay time and the frame rate may be arbitrarily set by an administrator of the information processing system 100.

Figure 7B:
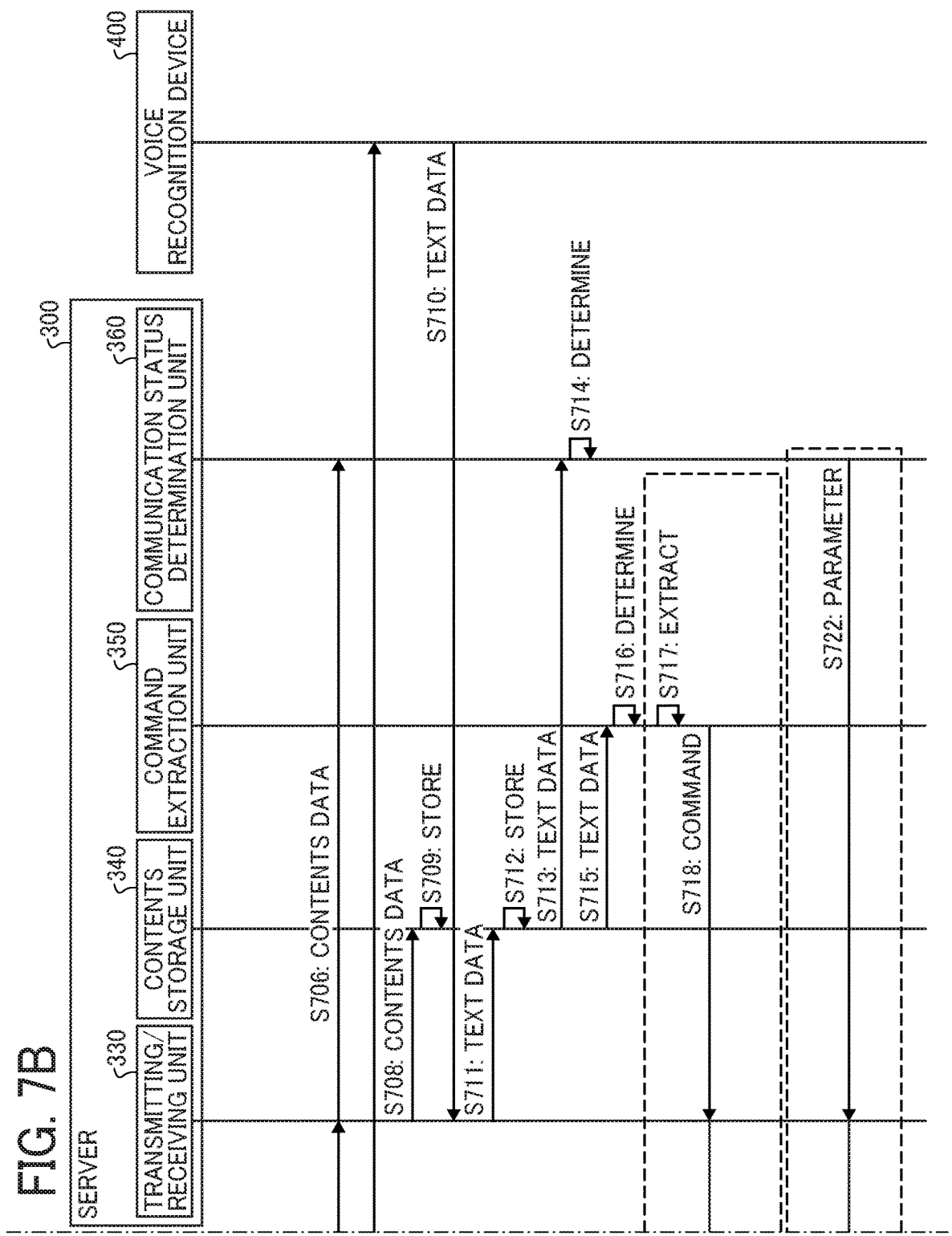

Hereinafter, a description is given of an operation of the information processing system 100 with reference to FIG. 7. FIGS. 7A and 7B are a sequence diagram illustrating the operation of the information processing system 100 of the first embodiment.

In the information processing system 100, when the sound collecting unit 210 of the electronic information board 200 acquires audio data, the sound collecting unit 210 transfers the audio data to the contents conversion unit 230 (step S701).

Further, when image data and video data are acquired via the input unit 220, the input unit 220 transfers the acquired image data and the video data to the contents conversion unit 230 (step S702).

Then, the contents conversion unit 230 converts the data format of the audio data, image data and video data based on the set parameters (step S703), and transfers the format-converted data to the transmitting/receiving unit 240 (step S704).

Then, the transmitting/receiving unit 240 transmits contents data including the image data, video data and audio data to the server 300 (step S705).

In the server 300, after the transmitting/receiving unit 330 receives the contents data in step S705, the transmitting/receiving unit 330 notifies to the communication status determination unit 360 that the contents data is received from the electronic information board 200 (step S706).

Further, the transmitting/receiving unit 240 transmits the audio data to the voice recognition device 400 (step S707).

In the server 300, after the transmitting/receiving unit 330 receives the contents data in step S705, the transmitting/receiving unit 330 transfers the contents data to the contents storage unit 340 (step S708), and then the contents storage unit 340 stores the received contents data in the contents DB 310 (step S709).

Further, after the transmitting/receiving unit 330 receives text data, which is a recognition result of the audio data, from the voice recognition device 400 (step S710), the transmitting/receiving unit 330 transfers the text data to the contents storage unit 340 (step S711).

Then, the contents storage unit 340 stores the text data in the contents DB 310 in association with the contents data received in step S708 (step S712).

Further, the contents storage unit 340 notifies the communication status determination unit 360 that the text data is received from the voice recognition device 400 (step S713).

Then, the communication status determination unit 360 calculates the communication delay time, which is a difference of a time point when the communication status determination unit 360 received the notification in step S706 and another time point when the communication status determination unit 360 received another notification in step S713, and then determines whether a value of the parameter is to be changed based on the calculated communication delay time (step S714).

Specifically, when the parameter value currently set in the contents conversion unit 230 does not match the parameter value associated with the communication delay time calculated by the communication status determination unit 360 by referring the parameter table 361, the communication status determination unit 360 determines that the parameter value currently set in the contents conversion unit 23 is to be changed based on the communication delay time calculated by the communication status determination unit 360.

The parameter value is changed when it is determined that the communication delay time becomes longer, and the network is assumed to be congested, or when the communication delay time is shortened, and the congestion of the network is resolved. In other words, the contents conversion unit 230 increases or decreases the data amount of the contents data other than the audio data depending on the communication delay time.

If it is determined that the parameter value is not to be changed in step S714, the communication status determination unit 360 ends the processing. On the other hand, if it is determined that the parameter value is to be changed in step S714, the sequence proceeds to step S722 to be described later.

Then, after the contents storage unit 340 acquires the text data from the voice recognition device 400, the contents storage unit 340 transfers the text data to the command extraction unit 350 (step S715).

After the command extraction unit 350 receives the text data, the command extraction unit 350 refers to the command DB 320 to determine whether the text data includes a command for the electronic information board 200 (step S716).

If it is determined that the command for the electronic information board 200 is not included in step S716, the command extraction unit 350 ends the processing.

If it is determined that the command for the electronic information board 200 is included in step S716, the command extraction unit 350 extracts the command (step S717), and transfers the command to the transmitting/receiving unit 330 (step S718).

Then, the transmitting/receiving unit 330 transmits the command to the electronic information board 200 (step S719).

After the electronic information board 200 receives the command via the transmitting/receiving unit 240, the transmitting/receiving unit 240 transfers the received command to the command execution unit 250 (step S720).

After the command execution unit 250 receives the command, the command execution unit 250 executes an operation instructed by the command (step S721), and ends the processing.

Further, when the communication status determination unit 360 determines that the parameter value is to be changed in step S714, the communication status determination unit 360 refers to the parameter table 361 and transfers the parameter value associated with the calculated communication delay time to the transmitting/receiving unit 330 (step S722).

Then, the transmitting/receiving unit 330 transmits the parameter value to the transmitting/receiving unit 240 of the electronic information board 200 (step S723). In other words, the transmitting/receiving unit 330 transmits an instruction to adjust the data amount of contents data other than audio data to the electronic information board 200.

In the electronic information board 200, after the transmitting/receiving unit 240 receives the parameter value, the transmitting/receiving unit 240 transfers the parameter value to the contents conversion unit 230 (step S724).

Then, the contents conversion unit 230 changes the parameter value, to be referred to when the data format of the image data and video data is to be converted, to the parameter value transferred from the transmitting/receiving unit 240 (step S725), and ends the processing.

In an example of FIG. 7, the processing of the command extraction unit 350 and the processing of the communication status determination unit 360 are performed at different timing, but not limited thereto. For example, the processing of the command extraction unit 350 and the processing of the communication status determination unit 360 can be executed in parallel.

As to the above described first embodiment, by adjusting the data amount of data other than the audio data transmitted from the electronic information board 200 to the server 300 depending on the communication delay time, the processing load on the network can be reduced.

In other words, as to the first embodiment, the data amount other than audio data is increased or decreased among the contents data transmitted from the electronic information board 200 to the server 300 depending on the communication delay time.

Therefore, as to the first embodiment, the audio data can be preferentially transmitted to the voice recognition device 400, and the command can be extracted, and thereby the responsiveness to voice operation can be enhanced.

Second Embodiment

Hereinafter, a description is given of a second embodiment with reference to the drawings. In the second embodiment, the communication status determination unit is disposed in the electronic information board 200, which differs from the first embodiment. Accordingly, in the description of the second embodiment, only the difference between the first embodiment and the second embodiment is described, and the same reference numerals used in the description of the first embodiment are assigned to components having the same functional configuration as those of the first embodiment, and description thereof is omitted.

Figure 8:
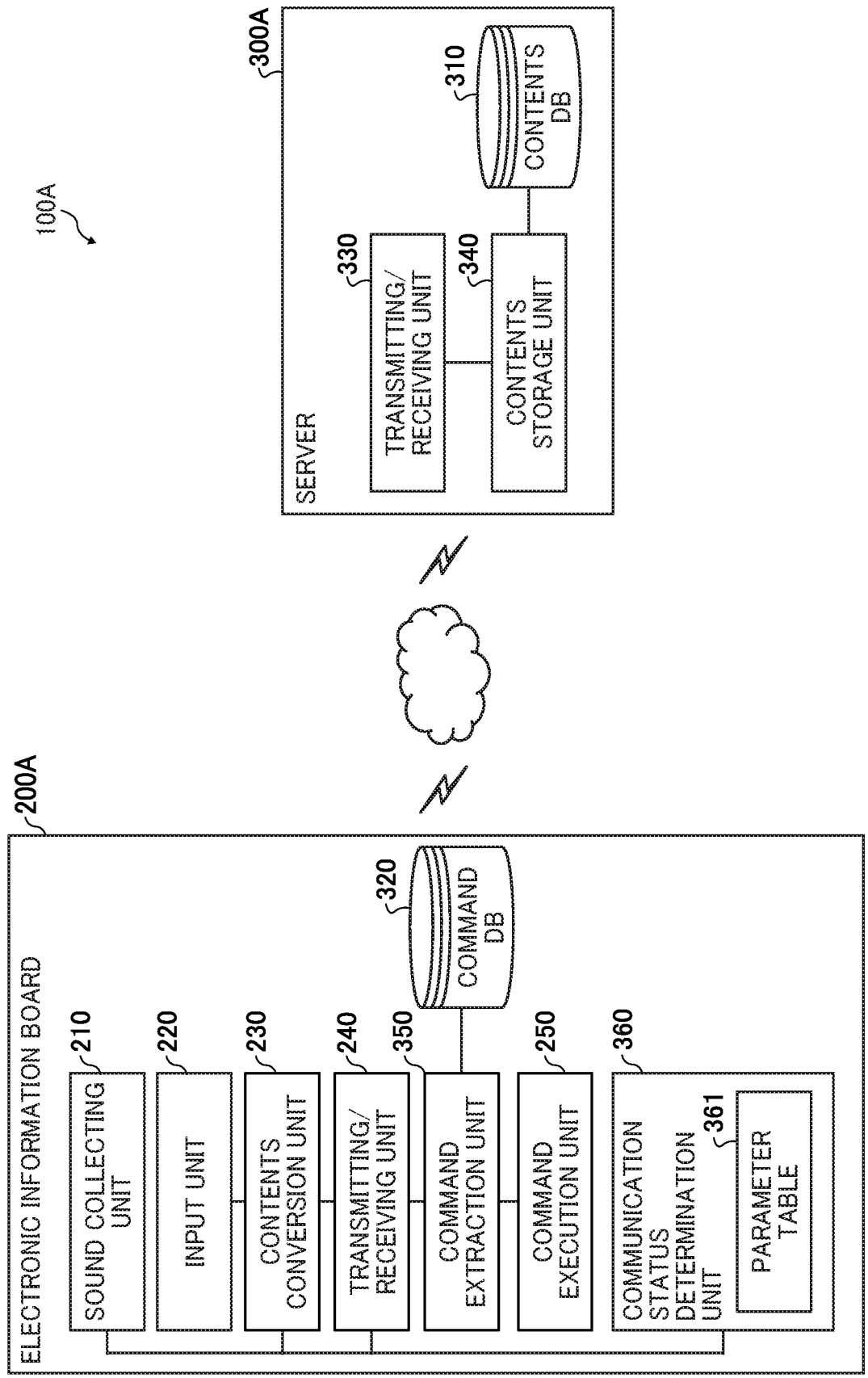
FIG. 8 illustrates an example of functional block diagrams of an electronic information board and a server used in an information processing system of a second embodiment.

FIG. 8 illustrates functions of each device or apparatus used in an information processing system 110A of the second embodiment.

In the second embodiment, the information processing system 100A includes, for example, an electronic information board 200A, and a server 300A.

As illustrated in FIG. 8, the electronic information board 200A includes, for example, the command DB 320, the command extraction unit 350, and the communication status determination unit 360 in addition to each unit of the electronic information board 200 of the first embodiment.

The server 300A includes, for example, the contents DB 310, the transmitting/receiving unit 330, and the contents storage unit 340.

In the information processing system 100A, the electronic information board 200A determines whether a command exists in the text data, which is the voice recognition result of the audio data by the voice recognition device 400, and extracts the command when the command exists in the text data.

The communication status determination unit 360 may set the communication delay time as a time difference, for example, between a time point when the audio data is transmitted from the electronic information board 200A to the voice recognition device 400 and a time point when the electronic information board 200A receives the text data as the voice recognition result.

Further, the communication status determination unit 360 may set the communication delay time as a time difference between a time point when the contents data is transmitted from the electronic information board 200A to the server 300A and a time point when the electronic information board 200A receives a notification indicating that the storage is completed from the server 300A.

Further, the communication status determination unit 360 may set the communication delay time by using an average of the above described time difference.

Hereinafter, a description is given of an operation of the information processing system 100A of the second embodiment with reference to FIG. 9. FIG. 9 is a sequence diagram illustrating the operation of the information processing system 100A of the second embodiment.

The processing from steps S901 to S905 in FIG. 9 is same as the processing from steps S701 to S705 in FIG. 7 so that the description thereof is omitted.

In the server 300A, after the transmitting/receiving unit 330 receives the contents data in step S905, the transmitting/receiving unit 330 transfers the received contents data to the contents storage unit 340 (step S906).

Then, after the contents storage unit 340 receives the contents data in step S906, the contents storage unit 340 stores the contents data in the contents DB 310 (step S907), and notifies the completion of storage to the transmitting/receiving unit 330 (step S908).

Then, the transmitting/receiving unit 330 transmits the storage completion notification to the electronic information board 200A (step S909).

Further, the electronic information board 200A transmits the audio data acquired by the sound collecting unit 210 to the voice recognition device 400 by using the transmitting/receiving unit 240 (step S910).

After the voice recognition device 400 receives the audio data, the voice recognition device 400 performs the voice recognition (step S911), and transmits the resulting text data to the electronic information board 200A (step S912).

Further, the voice recognition device 400 transmits the text data, which is the voice recognition result, to the server 300A (step S913).

In the server 300A, after the transmitting/receiving unit 330 receives the text data in step S913, the transmitting/receiving unit 330 transfers the received text data to the contents storage unit 340 (step S914).

Then, the contents storage unit 340 stores the text data in association with the contents data stored in step S907 (step S915).

In the electronic information board 200A, after the transmitting/receiving unit 240 receives the text data in step S912, the transmitting/receiving unit 240 transfers the received text data to the command extraction unit 350 (step S916).

After the command extraction unit 350 receives the text data in step S916, the command extraction unit 350 refers to the command DB 320 to determine whether the text data includes a command for the electronic information board 200A (step S917). When the command for the electronic information board 200A is not included in the text data, the command extraction unit 350 ends the processing.

On the other hand, when the command for the electronic information board 200A is included in the text data, the command extraction unit 350 extracts the command from the text data (step S918), and transfers the extracted command to the command execution unit 250 (step S919). After the command execution unit 250 receives the command, the command execution unit 250 executes an operation contents indicated by the command (step S920).

Further, the communication status determination unit 360 may calculate the communication delay time as a time difference between a time point when the contents data is transmitted in step S906 and a time point when the completion of the storage of the contents data is received in step S909 to determine whether the parameter value is to be changed (step S 921). Further, in the second embodiment, the communication status determination unit 360 may calculate the communication delay time as a time difference between a time point when the transmitting/receiving unit 240 transmits the audio data to the voice recognition device 400 and a time point when the transmitting/receiving unit 240 receives the text data from the voice recognition device 400.

If the communication status determination unit 360 determines that the parameter value is not to be changed in step S921, the communication status determination unit 360 ends the processing.

On the other hand, if the communication status determination unit 360 determines that the parameter value is to be changed in step S921, the communication status determination unit 360 transfers the parameter value associated with the calculated communication delay time, set in the parameter table 361, to the contents conversion unit 230 (step S922).

Then, the contents conversion unit 230 changes the parameter value by applying the parameter value received from the communication status determination unit 360 (step S923), and ends the processing.

In the above described second embodiment, the electronic information board 200A is provided with the command extraction unit 350 and the communication status determination unit 360. Therefore, in the second embodiment, the server 300A is configured to store the contents data alone, and thereby the server 300A can be simply used as a storage device.

Third Embodiment

Hereinafter, a description is given of a third embodiment with reference to the drawings. In the third embodiment, when a specific term is detected in the audio data collected by the sound collecting unit of the electronic information board, the audio data including the specific term is transmitted to the voice recognition device 400, which is different from the second embodiment. Accordingly, in the description of the third embodiment, only the difference between the third embodiment and the second embodiment is described, and the same reference numerals used in the description of the second embodiment are assigned to components having the same functional configuration as those of the second embodiment, and description thereof is omitted.

FIG. 10 illustrates functions of each device or apparatus used in an information processing system 100B of the third embodiment.

In the third embodiment, the information processing system 100B includes, for example, an electronic information board 200B, and a server 300A. In the third embodiment, the electronic information board 200B includes, for example, a specific term detection unit 260 in addition to each unit of the electronic information board 200A of the second embodiment.

The specific term detection unit 260 detects whether one or more specific terms are included in the audio data collected by the sound collecting unit 210.

Specifically, the specific term detection unit 260 can be configured to perform the voice recognition function, and a specific term can be detected from the audio data by using the voice recognition function. Further, the specific term detection unit 260 can be configured to store waveform data of one or more specific terms so that the specific terms can be detected when the specific terms are voiced. In this configuration, the specific term detection unit 260 detects the one or more specific terms when a waveform of audio data collected by the sound collecting unit 210 matches the waveform data of the one or more specific terms stored for the specific term detection unit 260.

The specific term is, for example, a word related to the electronic information board 200B, which is voiced as a trigger for performing a specific voice operation. In the third embodiment, it is highly likely that the audio data including the specific term may include a command for the electronic information board 200B.

In the third embodiment, when the specific term is detected from the audio data, the audio data indicating one sentence including the specific term is transmitted to the voice recognition device 400 prior to transmitting the contents data to determine whether or not the command is included in the audio data.

Hereinafter, a description is given of an operation of the information processing system 100B with reference to FIG. 11. FIGS. 11A and 11B are a sequence diagram illustrating the operation of the information processing system 100B of the third embodiment.

The processing from steps S1101 to S1103 of FIG. 11 is the same as the processing from steps S901 to S903 in FIG. 9 so that the description thereof is omitted.

After step S1103, in the electronic information board 200B, the contents conversion unit 230 transfers the audio data to the specific term detection unit 260 (step S1104).

Then, the specific term detection unit 260 determines whether the audio data includes a specific term (step S1105). If the specific term detection unit 260 does not detect the specific term in step S1105, the specific term detection unit 260 ends the processing, and the electronic information board 200B proceeds to step S1110 to be described later.

On the other hand, if the specific term detection unit 260 detects the specific term in step S1105, the specific term detection unit 260 transfers the audio data corresponding to one sentence including the specific term to the transmitting/receiving unit 240 (step S1106). In step S1106, the audio data to be transmitted to the transmitting/receiving unit 240 by the specific term detection unit 260 is not limited to the one sentence. For example, the specific term detection unit 260 may transfer the audio data of sentences that are several seconds before and after the audio data corresponding to the one sentence including the specific term to the transmitting/receiving unit 240.

After the transmitting/receiving unit 240 receives the audio data, the transmitting/receiving unit 240 transmits the audio data to the voice recognition device 400 (step S1107).

Then, the voice recognition device 400 performs the voice recognition on the audio data (step S1108), and transmits the resulting text data to the electronic information board 200B (step S1109).

The processing from steps S1110 to S1129 of FIG. 11 is the same as the processing from steps S 904 to S923 in FIG. 9 so that the description thereof is omitted.

In the above described third embodiment, when the audio data includes the specific term that is used as the trigger for performing the specific voice operation, the voice recognition is performed on the audio data corresponding to the one sentence including the specific term. In the above described processing of the third embodiment, the audio data that is likely to include the command for the electronic information board 200B is preferentially transmitted to the voice recognition device 400, and then the voice recognition can be performed.

Further, in the third embodiment, the audio data including the specific term is extracted as one portion of the entire audio data indicating the conversation, and then the audio data including the specific term is transmitted to the voice recognition device 400, with which the transmitted data amount can be reduced and the processing load on the network can be reduced. Therefore, according to the third embodiment, the responsiveness to the voice operation can be enhanced. Further, it is also possible to combine the first and third embodiments.

As to the above described embodiments, the responsiveness to the voice operation can be enhanced.

Although the description of the present invention has been made based on the embodiments described above, the present invention is not limited to the requirements described in the above embodiments. Numerous additional modifications and variations are possible in light of the above teachings. It is therefore to be understood that, within the scope of the appended claims, the disclosure of this patent specification may be practiced otherwise than as specifically described herein.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An information processing system configured to transfer contents data including a first type of contents data and a second type of contents data between a plurality of devices within the information processing system, the first type of contents data being audio data, the information processing system comprising:
processing circuitry configured to,
determine whether to change a data amount of the second type of contents data transmitted among the plurality of devices based on a communication delay time indicating a delay taken to transfer the first type of contents data for audio recognition processing, and
adjust the data amount of the second type of contents data based on the communication delay time associated with the first type of contents data.

2. The information processing system of claim 1, wherein the second type of contents data is image data including video data, and
the processing circuitry is configured to change at least one of a frame rate, a resolution, and a compression ratio of the video data to adjust the data amount of the second type of contents data based on the communication delay time associated with the first type of contents data.

3. The information processing system of claim 1, wherein the audio data is transmitted to a voice recognition device, wherein the processing circuitry is configured to,
extract, from a memory, at least one command including an operation contents to be applied to one of the plurality of devices from text data containing a result of the audio recognition processing, and
cause the one of the plurality of devices to execute the command.

4. The information processing system of claim 3, wherein the memory is configured to store a table associating the communication delay time and a quality of change of the data amount of the second type of contents data, and
the processing circuitry is configured to adjust the data amount of the second type of contents data based on the quality of change of the data amount associated with the communication delay time.

5. The information processing system of claim 3, wherein the processing circuitry is configured to,
determine whether the audio data includes a specific term, and
transmit the audio data including the specific term and having a given data length to the voice recognition device.

6. The information processing system of claim 5, wherein the specific term is a word set as a trigger for initiating a transmission of the command to the one of the plurality of devices.

7. An information processing apparatus configured to transfer contents data including a first type of contents data and a second type of contents data, the first type of contents data being audio data, the information processing apparatus comprising:
processing circuitry configured to,
determine whether to change a data amount of the second type of contents data transmitted between the information processing apparatus and an external device based on a communication delay time indicating a delay taken to transfer the first type of contents data between the information processing apparatus and the external device for audio recognition processing, the external device including a sound collecting apparatus used for collecting the audio data, and
transmit an instruction to the external device including the sound collecting apparatus to instruct the external device to adjust the data amount of the second type of contents data based on the communication delay time associated with the first type of contents data.

8. An information processing apparatus configured to transfer contents data including a first type of contents data and a second type of contents data, the first type of contents data being audio data, the information processing apparatus comprising:
a sound collecting device configured to collect audio data; and
processing circuitry configured to,
transmit and receive the first type of contents data including the audio data collected by the sound collecting device and the second type of contents data with an external device,
determine whether to change a data amount of the second type of contents data transmitted between the information processing apparatus and the external device based on a communication delay time indicating a delay taken to transfer the first type of contents data between the information processing apparatus and the external device for audio recognition processing, and
adjust the data amount of the second type of contents data based on the communication delay time associated with the first type of contents data.

9. The information processing system of claim 2, wherein the processing circuitry is configured to adjust the data amount of the second type of contents data based on the communication delay time associated with the first type of contents data such that the processing circuitry adjusts the data amount of the image data transmitted among the plurality of devices based on the communication delay time associated with the audio data.

10. The information processing apparatus of claim 7, wherein the second type of contents data is image data including video data, and
the processing circuitry is configured to change at least one of a frame rate, a resolution, and a compression ratio of the video data to adjust the data amount of the second type of contents data based on the communication delay time associated with the first type of contents data.

11. The information processing apparatus of claim 10, wherein the processing circuitry is configured to adjust the data amount of the second type of contents data based on the communication delay time associated with the first type of contents data such that the processing circuitry adjusts the data amount of the image data transmitted between the information processing apparatus and the external device based on the communication delay time associated with the audio data.

12. The information processing apparatus of claim 8, wherein the second type of contents data is image data including video data, and
the processing circuitry is configured to change at least one of a frame rate, a resolution, and a compression ratio of the video data to adjust the data amount of the second type of contents data based on the communication delay time associated with the first type of contents data.

13. The information processing apparatus of claim 12, wherein
the processing circuitry is configured to adjust the data amount of the second type of contents data based on the communication delay time associated with the first type of contents data such that the processing circuitry adjusts the data amount of the image data transmitted between the information processing apparatus and the external device based on the communication delay time associated with the audio data.

* * * * *